United States Patent
de la Houssaye

(10) Patent No.: US 6,517,610 B1
(45) Date of Patent: Feb. 11, 2003

(54) MICROELECTROMECHANICAL GAS CONCENTRATOR

(75) Inventor: Paul R. de la Houssaye, San Diego, CA (US)

(73) Assignee: The United States of America as represented by the Secretary of the Navy, Washington, DC (US)

( * ) Notice: Subject to any disclaimer, the term of this patent is extended or adjusted under 35 U.S.C. 154(b) by 0 days.

(21) Appl. No.: 10/014,072

(22) Filed: Nov. 13, 2001

(51) Int. Cl.⁷ .............................................. B01D 53/06
(52) U.S. Cl. ............................. 95/107; 95/114; 95/138; 96/123; 96/125; 96/126; 96/130
(58) Field of Search ........................... 95/107, 113, 114, 95/115, 138, 148; 96/123, 125, 126, 130, 143, 146, 150

(56) References Cited

U.S. PATENT DOCUMENTS

| | | | |
|---|---|---|---|
| 4,183,734 A | | 1/1980 | Leppard et al. |
| 4,378,982 A | * | 4/1983 | McCombs .................... 96/117 |
| 4,415,342 A | * | 11/1983 | Foss ........................ 423/245.1 |
| 4,612,022 A | * | 9/1986 | Berry ........................... 95/113 |
| 4,711,097 A | * | 12/1987 | Besik .......................... 62/271 |
| 4,711,646 A | | 12/1987 | Acharya et al. |
| 4,713,091 A | * | 12/1987 | Govinal ........................ 95/106 |
| 5,223,004 A | | 6/1993 | Eteve et al. |
| 5,308,590 A | | 5/1994 | Kersey et al. |
| 5,436,167 A | | 7/1995 | Robillard |
| 5,785,936 A | * | 7/1998 | Levendis .................... 110/203 |
| 5,788,744 A | | 8/1998 | Klobucar et al. |
| 5,891,219 A | | 4/1999 | Klobucar et al. |
| 5,893,944 A | * | 4/1999 | Dong .......................... 96/114 |
| 5,906,674 A | | 5/1999 | Tan et al. |
| 5,912,423 A | * | 6/1999 | Doughty et al. .............. 55/290 |
| 5,961,694 A | | 10/1999 | Monereau et al. |
| 6,056,804 A | * | 5/2000 | Keefer et al. ................. 95/113 |
| 6,110,247 A | * | 8/2000 | Birmingham et al. ......... 55/442 |
| 6,165,254 A | * | 12/2000 | Kawakami et al. ........... 96/125 |
| 6,197,097 B1 | * | 3/2002 | Ertl et al. ..................... 96/143 |

OTHER PUBLICATIONS

Gregory T. A. Kovacs et al, "Bulk Micromachining of Silicon", Proceedings of the IEEE, vol. 86, No. 8, Aug. 1998.

Abraham P. Lee et al, "Polysilicon Angular Microvibromotors", Journal of Microelectromechanical Systems, vol. 1, No. 2, Jun. 1992.

H. Guckel, "High–Aspect–Ratio Micromachining Via Deep X–Ray Lithography", Proceedings of the IEEE, vol. 86, No. 8, Aug. 1998.

Navid Yazdi et al, "Micromachined Inertial SEnsors", Proceedings of the IEEE, vol. 86, No. 8, Aug. 1998.

Hiroyuki Fujita, "Microactuators and Micromachines", Proceedings of the IEEE, vol. 86, No. 8, Aug. 1998.

Yogesh B. Gianchandani et al, "A Bulk Silicon Dissolved Waver Process for Microelectromechanical Devices", Journal of Microelectromechanical Systems, vol. 1, No. 2, Jun. 1992.

* cited by examiner

*Primary Examiner*—David A. Simmons
*Assistant Examiner*—Frank Lawrence
(74) *Attorney, Agent, or Firm*—Andrew J. Cameron; Celia C. Dunham; James A. Ward

(57) ABSTRACT

A microelectromechanical gas concentrator is fabricated for extracting a gaseous component from a gas mixture. The gas concentrator consists of an adsorbent member that alternatively moves between two regions on a single substrate. When the adsorbent member is in the first region, it is allowed to adsorb the gaseous component. When the adsorbent member moves to the second region, it is exposed to radiant energy, causing it to desorb the gaseous component. As the adsorbent member moves alternatively between regions, the gaseous component is adsorbed by the adsorbent member in the first region and desorbed in the second region, resulting in a pumping action that concentrates the gaseous component from one region to the other.

36 Claims, 12 Drawing Sheets

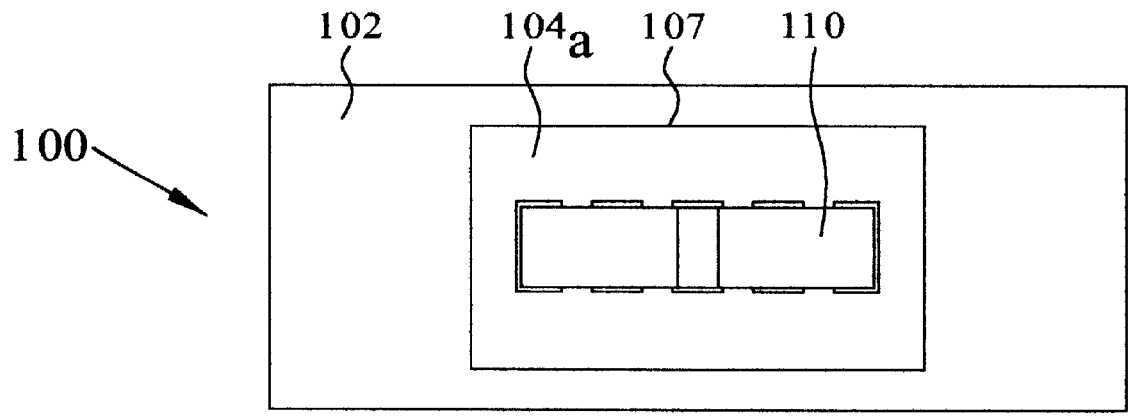
FIG. 2 (VIEW 2-2)
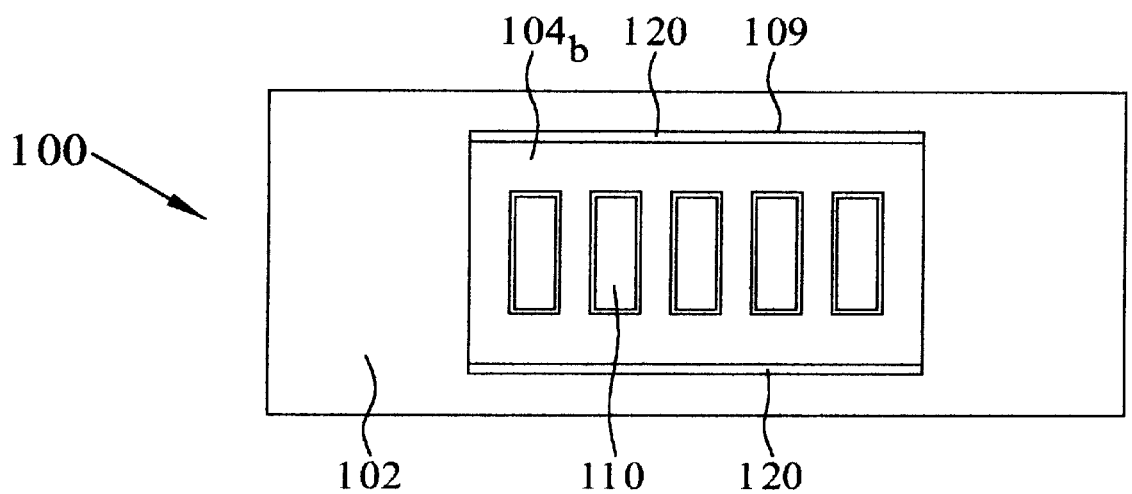
FIG. 3 (VIEW 3-3)

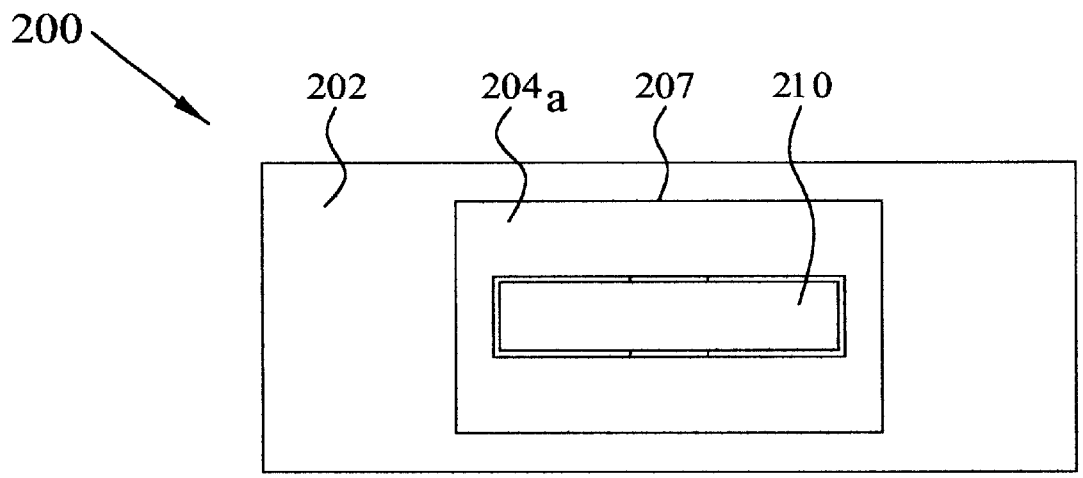
FIG. 6 (VIEW 6-6)
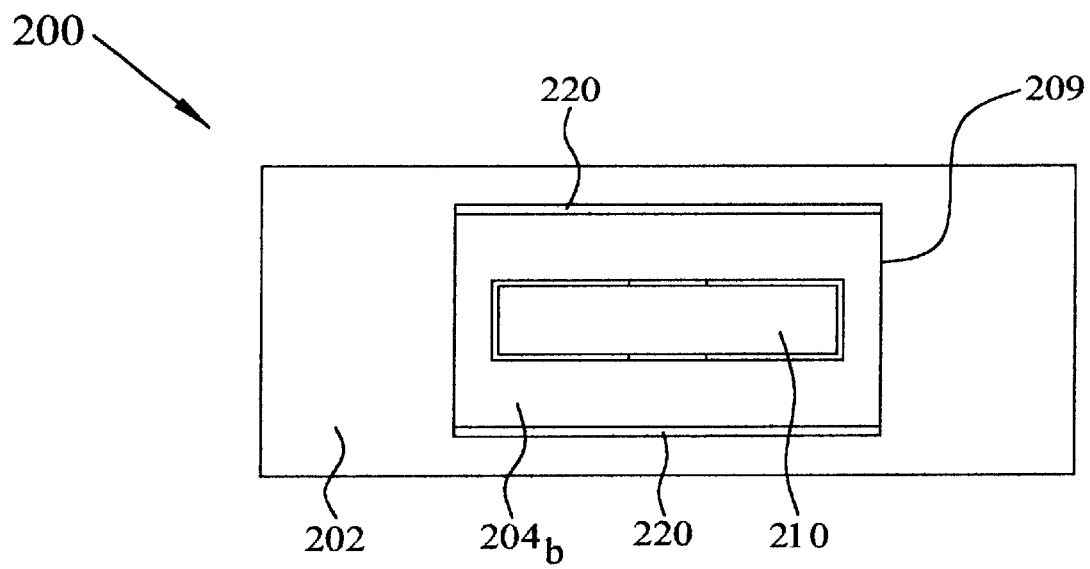
FIG. 7 (VIEW 7-7)

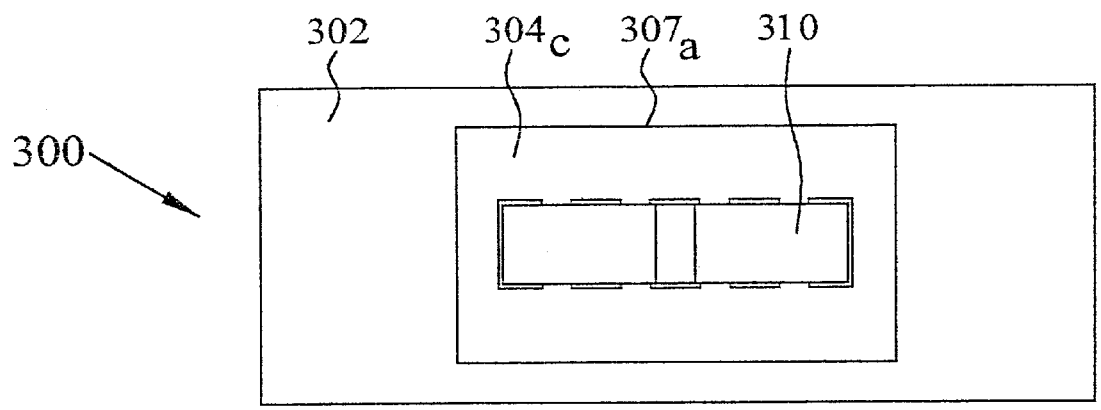
FIG. 10 (VIEW 10-10)
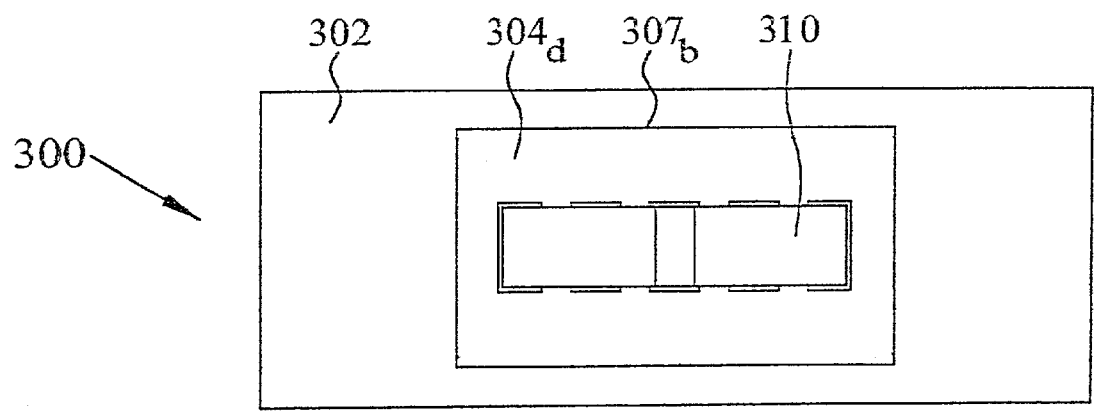
FIG. 11 (VIEW 11-11)

ମICROELECTROMECHANICAL GAS
CONCENTRATOR

BACKGROUND OF THE INVENTION

The present invention relates to a process for extracting a gaseous component from a gas mixture, and more particularly, to an adsorption/desorption process for extracting oxygen from air.

Modern technology now allows microelectromechanical systems (MEMs) to be fabricated on semiconductor substrates. Various MEMs structures have been produced such as, accelerometers, micropumps, and micromotors. The size of these MEMs structures are measured in microns, and like transistors, millions of them can be fabricated at one time. The applications of these MEMs devices have increasing importance in fields where ltP size and weight reduction play an important role. Such fields include, but are not limited to: aerospace, aeronautics, military, and biomedics.

There are many instances where a concentrated form of a gas is needed, but where the weight and size of a conventional compressed gas tank is too prohibitive or where a location is too remote for conventional gas delivery means. For instance, certain medical situations require substantially 100% oxygen. Even though air contains oxygen (approximately 21%), it goes mostly unused and in cases of civil disaster or military combat, medical units must resort to using heavy, expensive and potentially dangerous tanks of limited compressed oxygen. In another instance, diver's, and astronaut's breathing times are limited, in part, by the amount of gases that can be carried. If a diver wants to dive for a longer period of time he must carry a larger, heavier tank of compressed gases.

It can be appreciated that a gas concentrator that is relatively small, lightweight, inexpensive, and safe would satisfy the above described need.

SUMMARY OF THE INVENTION

The present invention is an adsorption/desorption process and a microelectromechanical gas concentrator for extracting a gaseous component from a gas mixture. Specifically, the invention concerns an adsorption/desorption process carried out in a microelectromechanical gas concentrator comprising of an adsorption region, a desorption region, and an adsorbent that alternatively moves between both regions. In addition to other uses, the present invention may be used to overcome the problems described above.

The adsorption/desorption process of the present invention involves alternatively moving an adsorbent member between first and second regions, adsorbing a gaseous component from one of the regions with the adsorbent member, and desorbing the gaseous component from the adsorbent member into the other region.

The microelectromechanical gas concentrator of the present invention includes a single substrate divided into an adsorption region and a desorption region. It includes an adsorbent member that is alternatively movable between both regions and adsorbs a gaseous component from a gas mixture when in the adsorption region and desorbs the gaseous component when in the desorption region.

An advantage of the microelectromechanical gas concentrator is that it is extremely small when compared to conventional gas delivery methods where the gas itself must be ported. Its size would be measured in tens or hundreds of microns. A single gas concentrator, in accordance with the present invention, could provide oxygen to a single biological cell. Multiple gas concentrators, in accordance with the present invention, may be used together in parallel to produce a larger volume of oxygen, which may be integrated into portable systems, such as medical unit oxygen supplies.

Another advantage of the microelectromechanical gas concentrator is that, because of its size, it is relatively light in weight. Its use will reduce the need to carry heavy tanks of compressed gas into remote areas.

Yet, another advantage of the microelectromechanical gas concentrator is that, because of the microfabrication process used to produce microelectromechanical devices, the invention may be manufactured relatively inexpensively. Millions of the gas concentrators may be produced at once, on a single. wafer or substrate. These gas concentrators may be arranged in parallel (for increased volume) or in series (for increased concentrations). Individual gas concentrators could also be integrated into other microfluidic systems.

Yet, another advantage of the microelectromechanical gas concentrator is that, compared to a compressed gas tank, the present invention is much safer to operate, maintain, and store.

Yet, another advantage of the microelectromechanical gas concentrator is that it will operate essentially indefinitely. That is, it's ability to provide a certain quantity of a concentrated gas is not dependant on a fixed volume container, such as a tank of compressed gas.

Still another advantage of the microelectromechanical gas concentrator is that, because of its size, it may be integrated into a portable respiratory apparatus, such as those used by divers or astronauts. This will allow the recirculation of exhaled oxygen back into the respirator, while releasing primarily excess carbon dioxide and nitrogen, substantially extending the useable operation/breathing time.

Still, another advantage of the microelectromechanical gas concentrator is that the pumping rate of the gas concentrator can be easily measured.

The previously summarized features and advantages along with other aspects of the present invention will become clearer upon review of the following specification taken together with the included drawings.

BRIEF DESCRIPTION OF THE DRAWING

FIG. 2 is a side view (view 2—2 as indicated in FIG. 1A) of the first embodiment of a microelectromechanical gas concentrator in accordance with the present invention.

FIG. 3 is another side view (view 3—3 as indicated in FIG. 1A) of the first embodiment of a microelectromechanical gas concentrator in accordance with the present invention.

FIG. 6 is a side view (view 6—6 as indicated in FIG. 5A) of the second embodiment of a microelectromechanical gas concentrator in accordance with the present invention.

FIG. 7 is another side view (view 7—7 as indicated in FIG. 5A) of the second embodiment of a microelectromechanical gas concentrator in accordance with the present invention.

FIG. 10 is a side view (view 10—10 as indicated in FIG. 9) of the third embodiment of a microelectromechanical gas concentrator in accordance with the present invention.

FIG. 11 is another side view (view 11—11 as indicated in FIG. 9) of the third embodiment of a microelectromechanical gas concentrator in accordance with the present invention.

DESCRIPTION OF SOME EMBODIMENTS

Figure 1A:
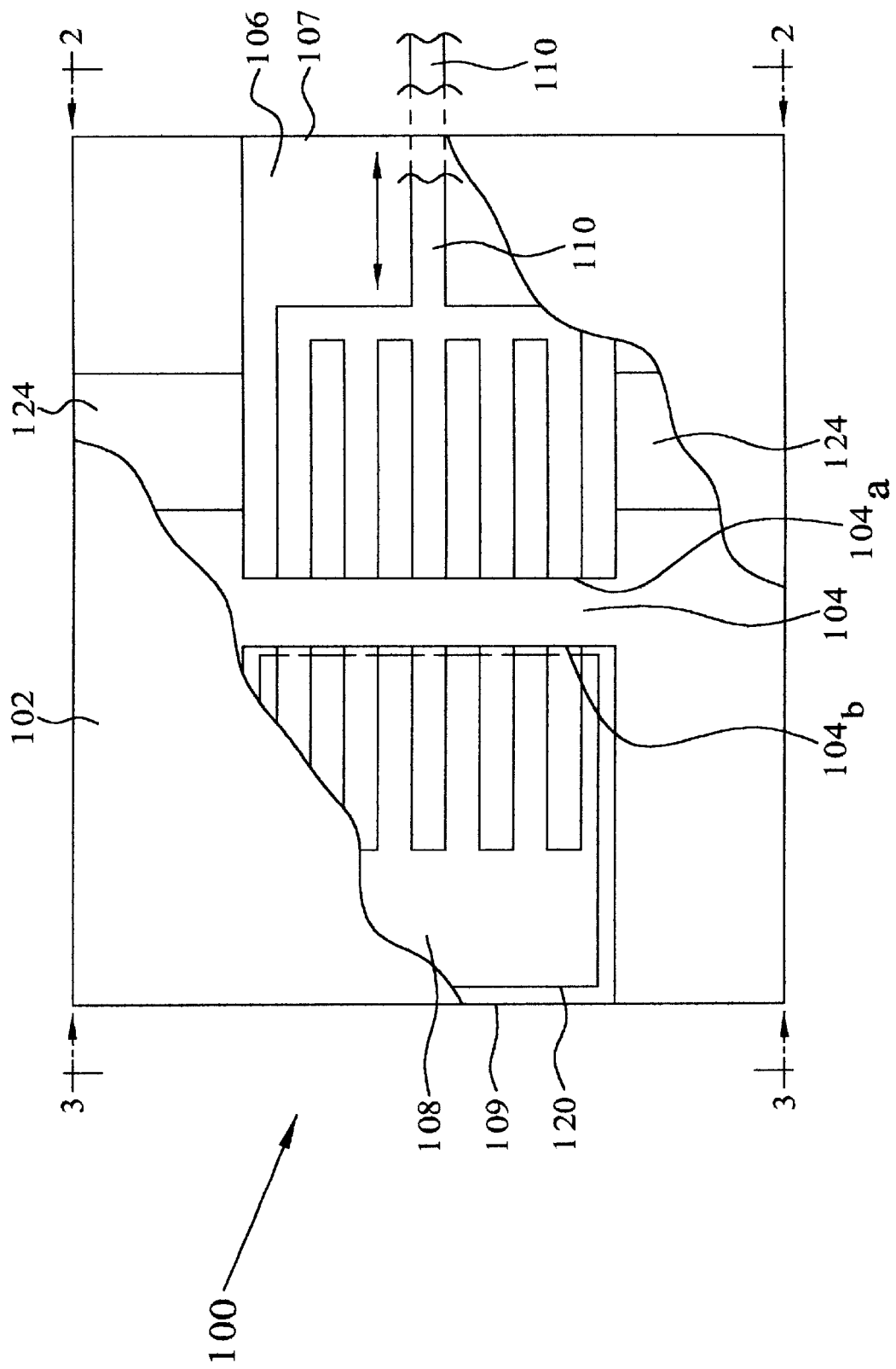
FIG. 1A is a top view of a first embodiment of a microelectromechanical gas concentrator in accordance with the present invention.

FIGS. 1A, 1B, 2, and 3 show a first embodiment of a microelectromechanical gas concentrator in accordance with the present invention. Microelectromechanical gas concentrator 100 comprises a single substrate 102, a portion of which, is divided into an adsorption region 106 and a desorption region 108 by dividing wall 104. Adsorption region 106 includes input port 107 defined by an opening in the adsorption region 106 opposite side 104a of the dividing wall 104. Likewise, desorption region 108 includes an output port 109 defined by an opening in the region opposite side 104b of the dividing wall 104.

Figure 4:
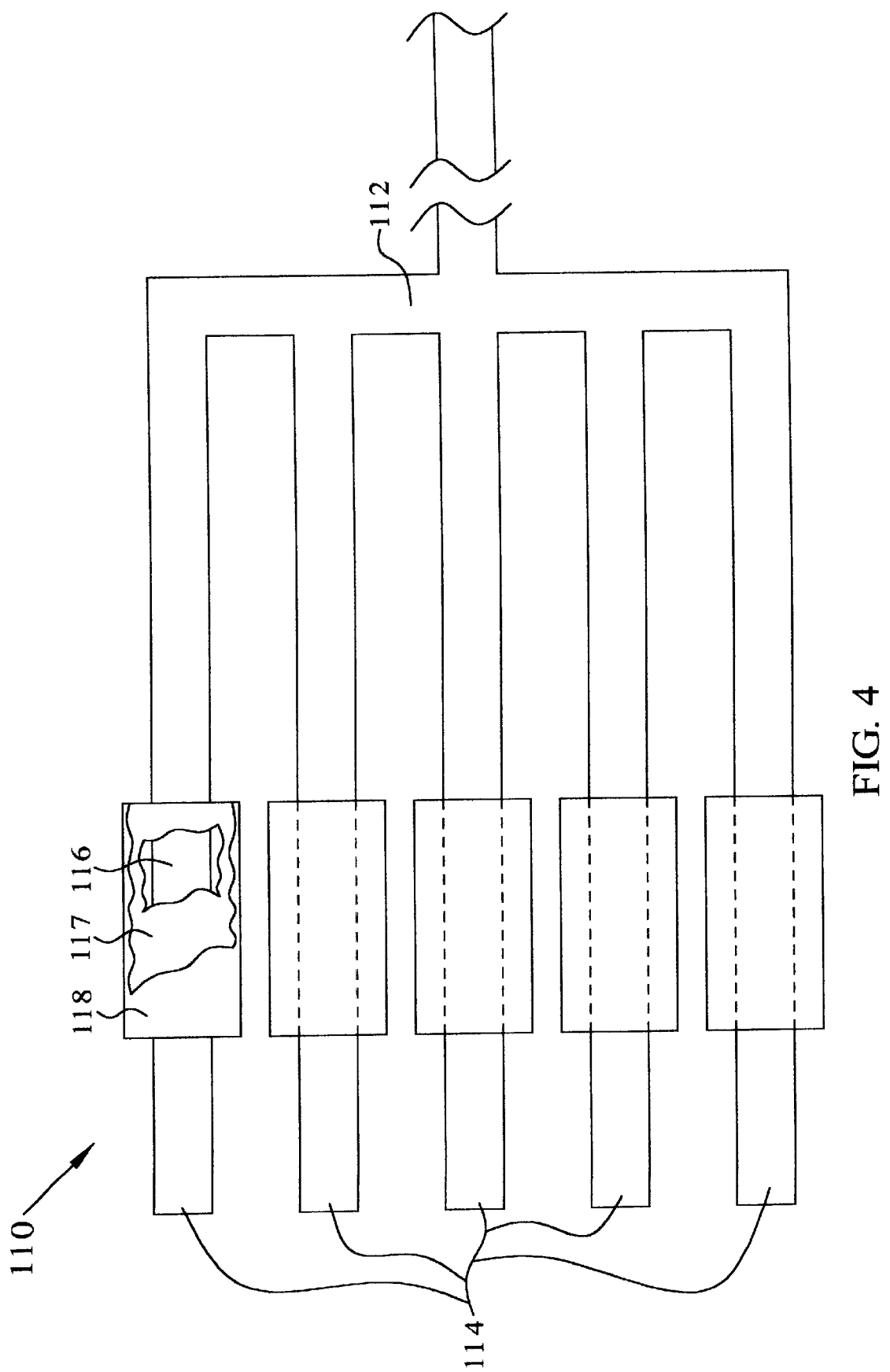
FIG. 4 is a top view of an adsorbent member of the first embodiment of a microelectromechanical gas concentrator in accordance with the present invention.
Figure 5A:
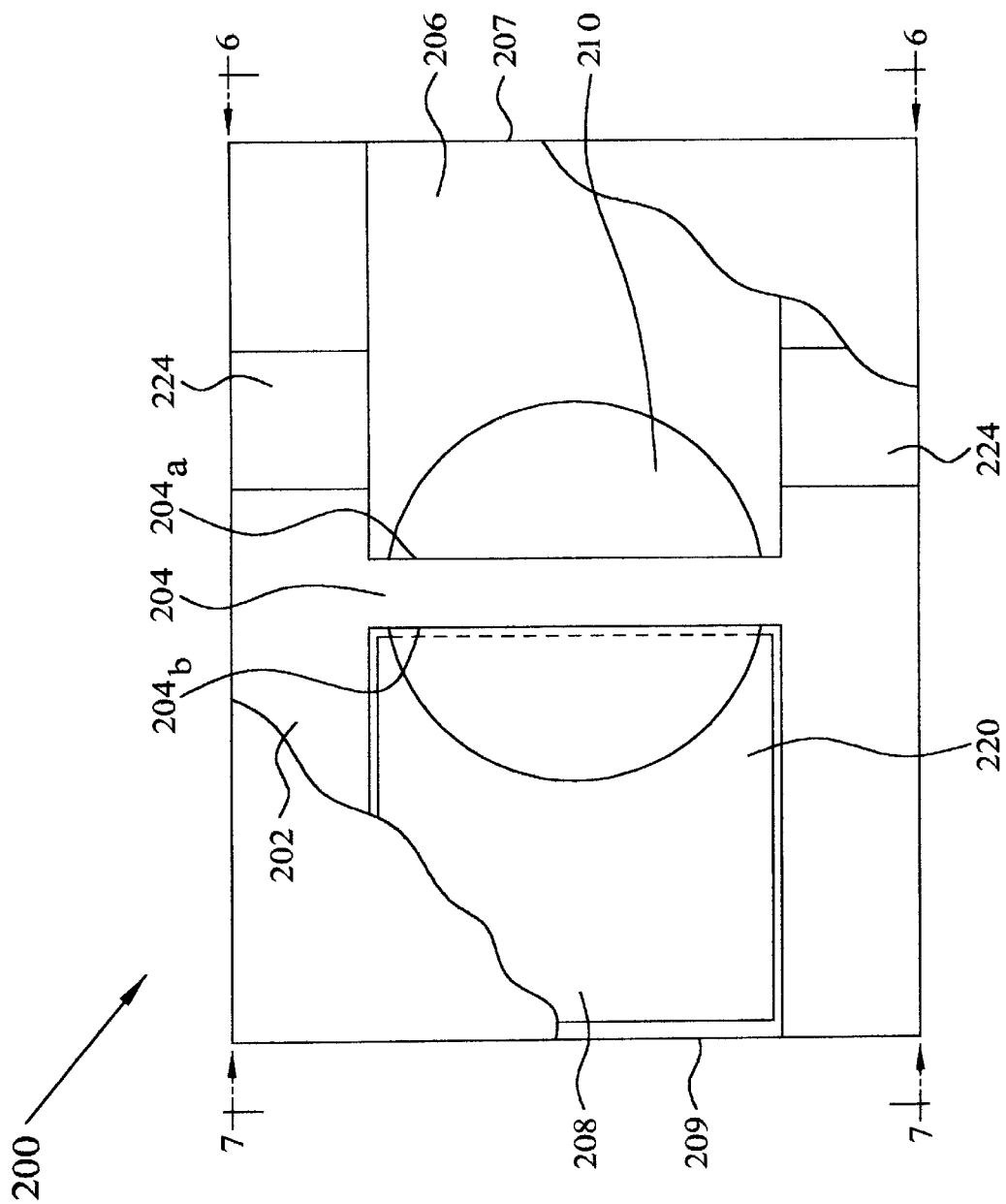
FIG. 5A is a top view of a second embodiment of a microelectromechanical gas concentrator in accordance with the present invention.
Figure 5B:
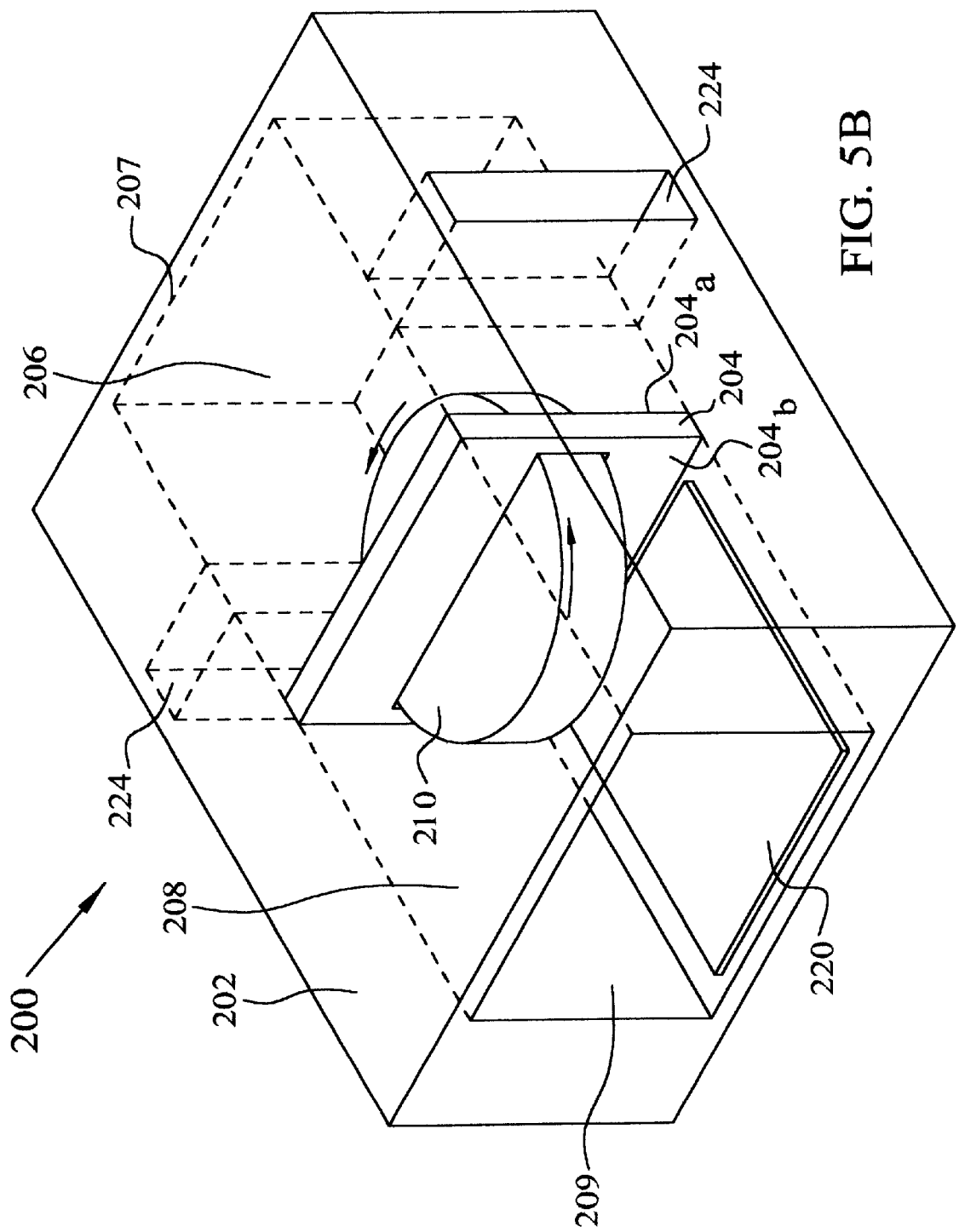
FIG. 5B is a perspective view of the second embodiment of a microelectromechanical gas concentrator in accordance with the present invention.

Located on substrate 102 is an adsorbent member 110. In the microelectromechanical gas concentrator 100, adsorbent member 110 is in the shape of a comb. FIG. 4 shows adsorbent member 110 (not drawn to scale), which comprises at least one comb tooth 114 orthogonally connected to a comb base 112. Adsorbent member 110 is shown as a comb shape with five comb teeth 114, but may be constructed to have one or more comb teeth and may even be constructed in a different shape. Comb tooth 114 is representative of all teeth shown or used in this embodiment. Some different shapes of adsorbent members are shown in FIG. 5A with adsorbent member 210 in microelectromechanical gas concentrator 200 and in FIG. 9 with adsorbent member 310 in microelectromechanical gas concentrator 300.

Adsorbent member 110 further comprises base layer; 116 and adaorption layer 118, as shown in FIG. 4. An optional adhesion layer 117 may be included for isolating the base layer 116 from the adsorption layer 118. Base layer 116 is typically made of a semiconductor material, such as silicon, although other materials could be used such as silicon dioxide or silicon nitride. Adhesion layer 117 is also typically made of semiconductor material, such as silicon or alternatively silicon nitride. The adsorption layer 118 is chosen, such that a particular gaseous component may be adsorbed. Adsorption layer 118 must also have the ability to substantially regenerate by desorbing the gaseous component when subjected to radiant energy. By way of example, electromechanical gas concentrator 100 may be configured to concentrate oxygen from air by selecting adsorption layer 118 as a cobalt(II) salen complex. Although adhesion layer 117 and adsorption layer 118 may extend the entire length of comb teeth 114 or even cover the entire base layer 116, FIG. 4 shows the preferred coverage of these layers only to extend that portion of the base layer 116 which traverses between the adsorption region 106 and desorption region 108 of microelectromechanical gas concentrator 100.

Referring again to FIGS. 1A and 1B, adsorbent member 110 is reciprocally movable between adsorption region 106 and desorption region 108. By way of example, adsorbent member 110 is reciprocally moved by the application of an electrostatic force. Adsorbent member 110 is reciprocally moved substantially at resonance, to minimize energy requirements. An actuator (not shown) is operatively connected to adsorbent member 110. The process of applying an electrostatic force to an electromechanical structure to achieve reciprocal movement is well known in the art of MEMs technology.

FIG. 1A shows radiant energy source 120, optionally microfabricated into desorption region 108. Radiant energy source 120 subjects the adsorbent member 110 to radiant energy, so that the adsorption layer 118 of adsorbent member 110 desorbs the gaseous component into desorption region 108 and becomes substantially regenerated. For this example, radiant energy source 120, is a microfabricated heater strip, but could alternatively be light provided by the sun or other light source in or outside desorption region 108.

Microelectromechanical gas concentrator 100 optionally includes an input filter coupled to input port 107, for preventing contaminant particles from entering adsorption region 106, while still allowing the gas mixture to pass through.

Figure 1B:
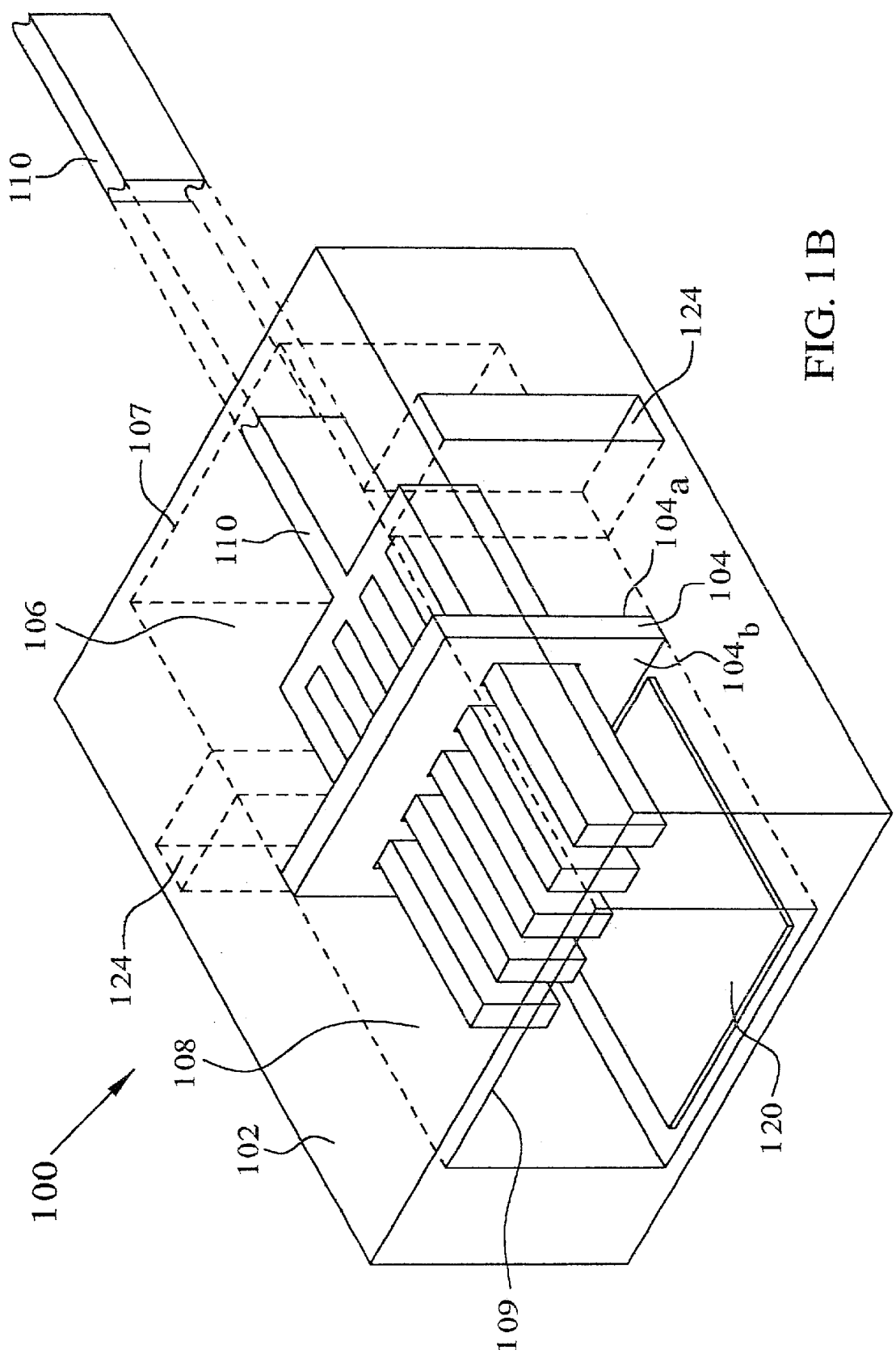
FIG. 1B is a perspective view of the first embodiment of a microelectromechanical gas concentrator in accordance with the present invention.

Microelectromechanical gas concentrator 100 may also include a residual gas port 124, fabricated in the substrate 102 on the adsorption region 106 side of dividing wall 104, for allowing residual gas remaining in the adsorption region 106 to exit the adsorption region 106. By way of example, FIGS. 1A and 1B show microelectromechanical gas concentrator 100 with two residual gas ports 124.

A basic method of operation for the lie microelectromechanical gas concentrator 100 as shown in FIG. 1A is described as follows:

adsorbent member 110 is reciprocally moved, substantially at resonance, between adsorption region 106 and desorption region 108;

adsorption layer 118 of adsorbent member 110 adsorbs a gaseous component from a gas mixture when in adsorption region 106 and becomes partially saturated with the gaseous component; and adsorbent member 110 is subjected to radiant energy from radiant energy source 120 when in desorption region 108, so that adsorption layer 118 of adsorbent member 110 desorbs the gaseous component into desorption region 108 and becomes substantially unsaturated.

For successful operation, the volume of the gaseous component desorbed into desorption region 108 should be sufficient to create and maintain a higher partial pressure in desorption region 108 than in adsorption region 106. The volume of the gaseous component desorbed must also be greater than the volume of the gaseous component that passes from desorption region 108 back to adsorption region 106 through the space between dividing wall 104 and comb teeth 114 of adsorbent member 110. This partial pressure difference between adsorption region 106 and desorption region 108 allows the gaseous component to be substantially expelled out of microelectromechanical gas concentrator 100 through exit port 109. The partial pressure difference may be created and maintained by manipulation of one or more different aspects of the microelectromechanical gas concentrator 100. These aspects include, but are not limited to, the surface area of adsorbent member 110, the speed at which adsorbent member 110 moves between adsorption region 106 and desorption region 108, the material itself that makes up adsorption layer 118 of the adsorbent member 110, and the time and intensity of exposure to radiant energy while adsorbent member 110 is in desorption chamber 108.

The pumping rate of microelectromechanical gas concentrator 100 may be determined during operation by calculating the extra weight of the adsorbed gas by measuring the reduction in resonant frequency of the adsorbent member 110.

A second embodiment of a microelectromechanical gas concentrator in accordance with the present invention is shown in FIGS. 5A, 5B, 6, and 7. Microelectromechanical gas concentrator 200 comprises a substrate 202, a portion of which, is divided into an adsorption region 206 and a desorption region 208, by dividing wall 204. Adsorption region 206 includes input port 207 defined by an opening in the adsorption region 206 opposite side 204a of the dividing wall 204. Likewise, desorption region 208 includes an output port defined by an opening in the desorption region 208 opposite side 204b of the dividing wall 204.

Figure 8A:
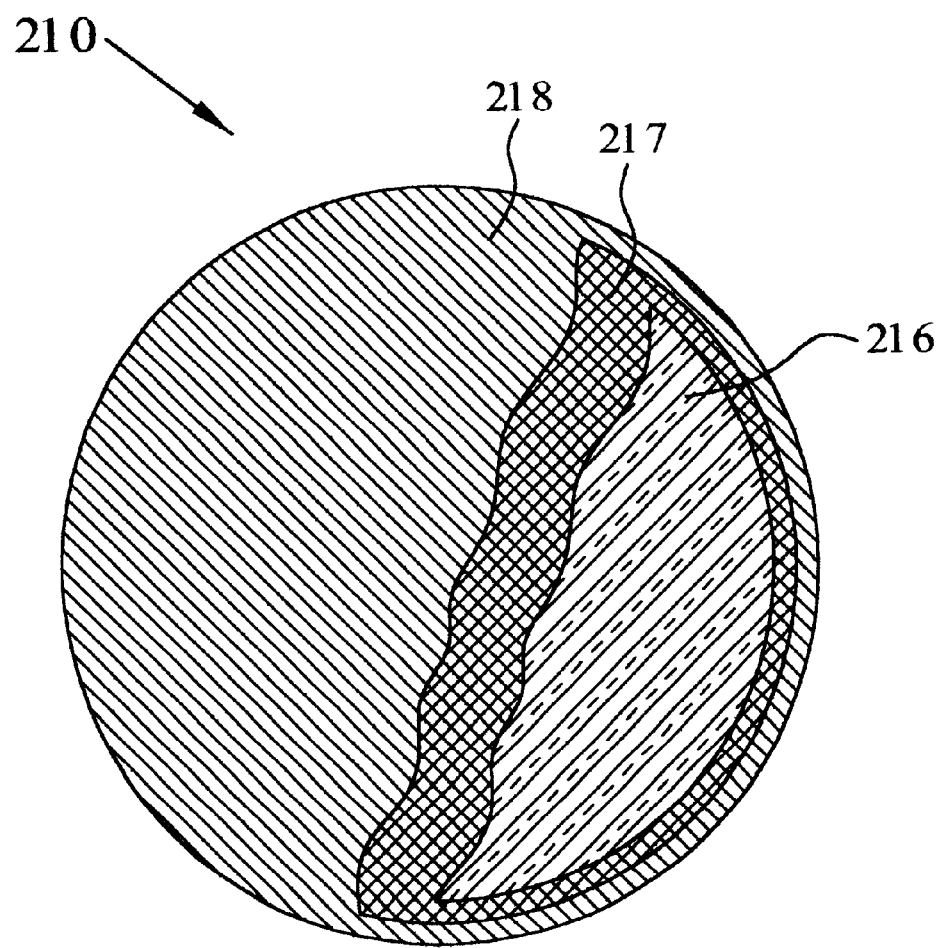
FIG. 8A is a top view of an adsorbent member of the second embodiment of a microelectromechanical gas concentrator in accordance with the present invention.
Figure 8B:
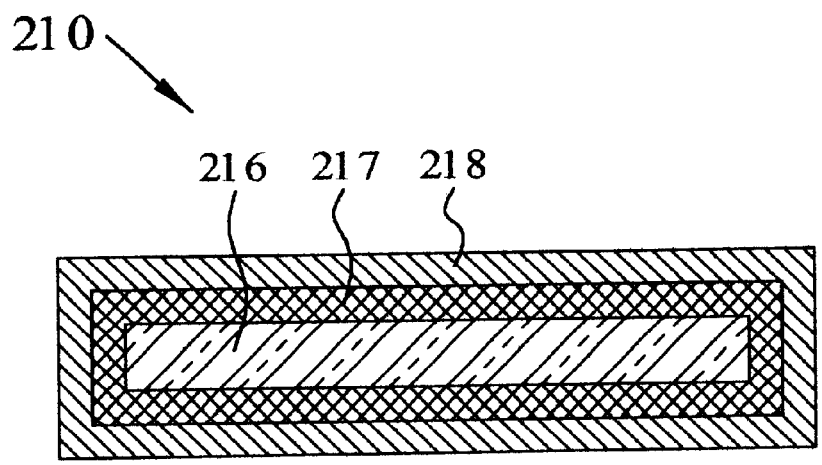
FIG. 8B is a side view of an adsorbent member of the second embodiment of a microelectromechanical gas concentrator in accordance with the present invention.

Fabricated on substrate 202 is an adsorbent member 210. In microelectromechanical gas concentrator 200, adsorbent member 210 is cylindrical in shape and is radially rotatable. As shown in FIGS. 8A and 8B, adsorbent member 210 comprises base layer 216 and adsorption layer 218. Adsorbent member 210 may further comprise adhesion lazer 217, for isolating the base layer 216 from the adsorption layer 218. By way of example, adsorbent member 210 may be rotated by the application of an electrostatic force.

Base layer 216 is typically made of a semiconductor material, such as silicon, although other materials could be used such as silicon dioxide or silicon nitride. Adhesion layer 217 is also typically made of semiconductor material, such as silicon or alternatively silicon nitride. The adsorption layer 218 is chosen, such that a particular gaseous component may be adsorbed. Adsorption layer 218 must also have the ability to substantially regenerate by desorbing the gaseous component when subjected to radiant energy. By way of example electromechanical gas concentrator 200 may be configured to concentrate oxygen from air by selecting adsorption layer 218 as a cobalt(II) salen complex.

FIG. 5A shows radiant energy source 220, optionally microfabricated into desorption region 208. Radiant energy source 220 subjects adsorbent member 210 to radiant energy, so that the adsorption layer 218 of adsorbent member 210 desorbs the gaseous component into desorption region 208 and becomes substantially regenerated. In this embodiment, radiant energy source 220 is a microfabricated heater strip, but could alternatively be light provided by the sun or other light source in or outside desorption region 208.

Microelectromechanical gas concentrator 200 optionally includes an input filter coupled to adsorption region 206 for preventing contaminant particles from entering while still allowing the gas mixture to pass through.

Microelectromechanical gas concentrator 200 may also include a residual gas port 224 fabricated on the substrate 202 on the adsorption region 206 side of dividing wall 204, for allowing residual gas left in the adsorption region 206, to exit the adsorption region 206.

A basic method of operation for the microelectromechanical gas concentrator 200 as shown in FIG. 5A is described as follows:

adsorbent member 210 is radially rotated between adsorption region 206 and desorption region 208;

adsorption layer 218 of adsorbent member 210 adsorbs a gaseous component from a gas mixture when in adsorption region 206 and becomes partially saturated with gaseous the component; and adsorbent member 218 is subjected to radiant energy from radiant energy source 220 when in desorption region 208, so that adsorption layer 218 of adsorbent member 210 desorbs the gaseous component into desorption region 208 and becomes substantially unsaturated.

As with the first embodiment this embodiment should have a partial pressure difference between adsorption region 206 and desorption region 208, by desorbing a volume of the gaseous component into the desorption region 208 adequate to maintain a higher partial pressure in the desorption region 208 than in the adsorption region 206. This partial pressure difference allows the gaseous component to expel itself from microelectromechanical gas concentrator 200 through exit port 209. The partial pressure difference may be created and maintained by manipulation of one or more different aspects of the microelectromechanical gas concentrator 200. These aspects include, but are not limited to, the surface area of adsorbent member 210, the speed at which adsorbent member 210 radially rotates, and the material itself that makes up adsorption layer 218 of the adsorbent member 210.

Figure 9:
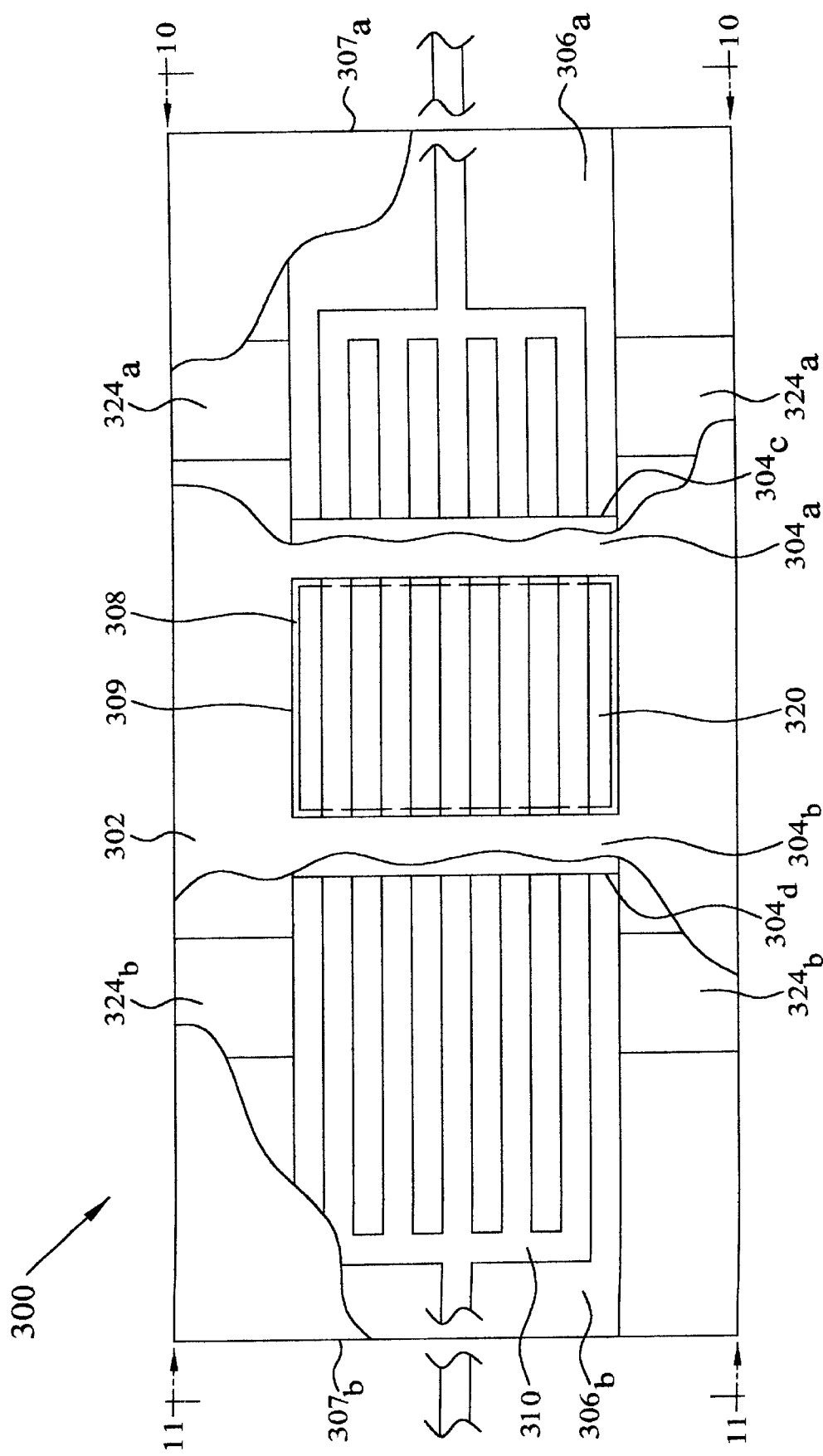
FIG. 9 is a top view of a third embodiment of a microelectromechanical gas concentrator in accordance with the present invention.

FIGS. 9, 10, 11 shows another embodiment of a microelectromechanical gas concentrator in accordance with the present invention. Microelectromechanical gas concentrator 300 comprises a substrate 302, a portion of which, is divided into adsorption regions 306(a), 306(b), and desorption region 308, by dividing wall(s) 304(a) and (b). Adsorption region 306(a) includes input port 307(a) defined by the opening in the adsorption region 306(a) opposite side 304(c) of dividing wall 304(a). Likewise, adsorption region 306(b) includes an input port 307(b) defined by an opening opposite side 304(d) of dividing wall 304(b). Similarly, desorption region 308 includes an output port 309 defined by an opening in the region between the dividing walls 304 of substrate 302.

Figure 12:
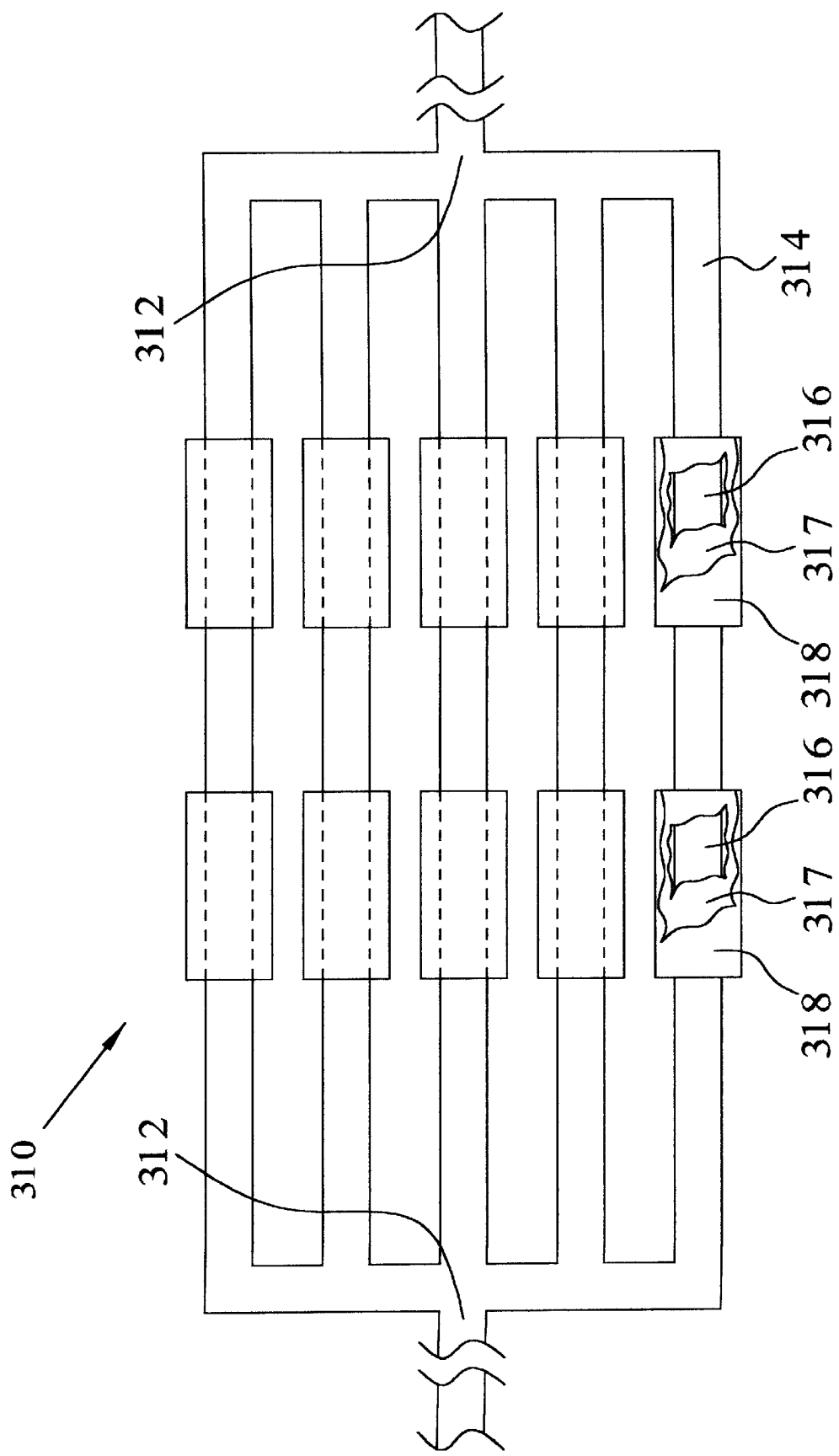
FIG. 12 is a top view of an adsorbent member of the third embodiment of a microelectromechanical gas concentrator in accordance with the present invention.

Fabricated on substrate 302 is an adsorbent member 310. In the microelectromechanical gas concentrator 300, adsorbent member 310 is in the shape of an enclosed comb. FIG. 12 shows adsorbent member 310 (not drawn to scale), which comprises at least one comb tooth 314 orthogonally connected to comb bases 312. Although, adsorbent member 310 is shown as a comb shape with five comb teeth 314, it is noted that adsorbent member 310 may be constructed to have one or more comb teeth. Comb tooth 314 is representative of all teeth shown or used in this embodiment.

Adsorbent member 310 further comprises a base layer 316 and an adsorption layer 318, as shown in FIG. 12. An optional adhesion layer 317 may also be included for isolating the base layer 316 from the adsorption layer 318. Base layer 316 is typically made of a semiconductor material, such as silicon, although other materials could be used such as silicon dioxide or silicon nitride. Adhesion layer 317 is also typically made of semiconductor material, such as silicon or alternatively silicon nitride. The adsorption layer 318 is chosen, such that a particular gaseous component may be adsorbed. Adsorption layer 318 must also have the ability to substantially regenerate by desorbing the gaseous component when subjected to radiant energy. By way of example, electromechanical gas concentrator 300 may be configured to concentrate oxygen from air by selecting adsorption layer 318 as a cobalt(II) selen complex. Although adhesion layer 317 and adsorption layer 318 may extend the entire length of comb teeth 314 or even cover the entire base layer 316, FIG. 12 shows the preferred coverage of these layers only to extend that portion of the base layer 116 which traverses between adsorption regions 306(a), (b) and desorption region 308.

Referring again to FIG. 9, adsorbent member 310 is reciprocally movable between adsorption regions 306(a)–(b) and desorption region 308. By way of example, adsorbent member 310 is reciprocally moved by the application of an electrostatic force. Adsorbent member 310 is reciprocally moved substantially at resonance, to minimize energy requirements.

FIG. 9 shows radiant energy source 320, optionally microfabricated into desorption region 308. Radiant energy source 320 subjects the adsorbent member 310 to radiant energy, so that the adsorption layer 318 of adsorbent member 310 desorbs the gaseous component into desorption region 308 and becomes substantially regenerated. For this example, radiant energy source 320 is a microfabricated heater strip, but could alternatively be light provided by the sun or other light source in or outside desorption region 308.

Microelectromechanical gas concentrator 300 optionally includes an input filter coupled to input ports 307(a) and (b), for preventing contaminant particles from entering while still allowing the gas mixture to pass through.

Microelectromechanical gas concentrator 300 may also include a residual gas ports 324(a) and (b), fabricated on the substrate 302 in the adsorption regions 306(a) and (b) respectively, for allowing residual gas left in the adsorption regions 306(a) and (b), to exit the adsorption regions.

A basic method of operation for the microelectromechanical gas concentrator 300 as shown in FIG. 9 is described as follows:

adsorbent member 310 is reciprocally moved, substantially at resonance, between adsorption regions 306(a), (b) and desorption region 308;

adsorption layer 318 of adsorbent member 310 adsorbs a gaseous component from a gas mixture when in adsorption regions 306(a) and (b) and becomes partially saturated with the gaseous component; and adsorbent member 310 is subjected to radiant energy from radiant energy source 320 when in desorption region 308, so that adsorption layer 318 of adsorbent member 310 desorbs the gaseous component into desorption region 308 and becomes substantially unsaturated.

For successful operation, the volume of the gaseous component desorbed into desorption region 308 must be sufficient to create and maintain a higher partial pressure in desorption region 308 than in adsorption regions 306(a) and (b). The volume of the gaseous component desorbed must also be greater than the volume of the gaseous component that passes from desorption region 308 back to adsorption regions 306(a) and (b) through the space between dividing walls 304(a) and (b) respectively and comb teeth 314. This partial pressure difference between adsorption regions 306 (a) and (b) and desorption region 308 allows the gaseous component to be substantially expelled out of microelectromechanical gas concentrator 300 through exit port 309. The partial pressure difference may be created and maintained by manipulation of one or more different aspects of the microelectromechanical gas concentrator 300. These aspects include, but are not limited to, the surface area of adsorbent member 310, the speed at which adsorbent member 310 moves between adsorption regions 306(a) and (b) and desorption region 308, the material itself that makes up adsorption layer 318 of the adsorbent member 310, and the time and intensity of exposure to radiant energy while adsorbent member 310 is in desorption chamber 308.

The pumping rate of microelectromechanical gas concentrator 300 may be determined during operation by calculating the extra weight of the adsorbed gas by measuring the reduction in resonant frequency of the adsorbent member 310.

Figure 13:
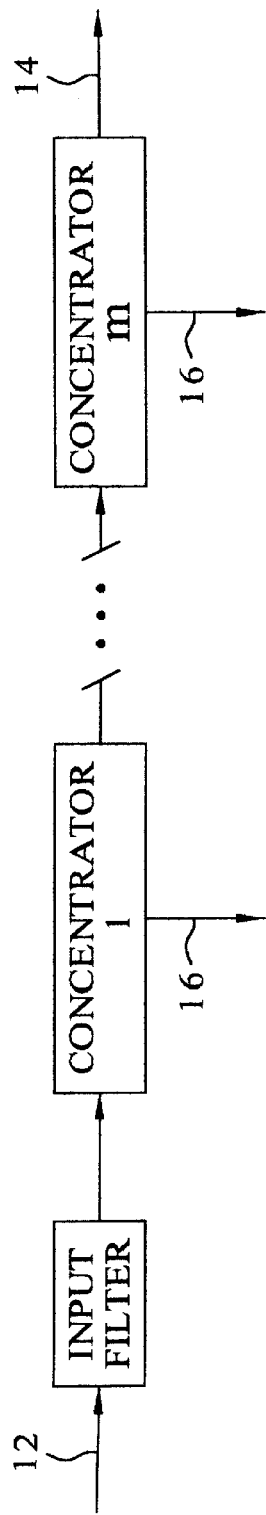
FIG. 13 is a block diagram of multiple microelectromechanical gas concentrators in series in accordance with the present invention.
Figure 14:
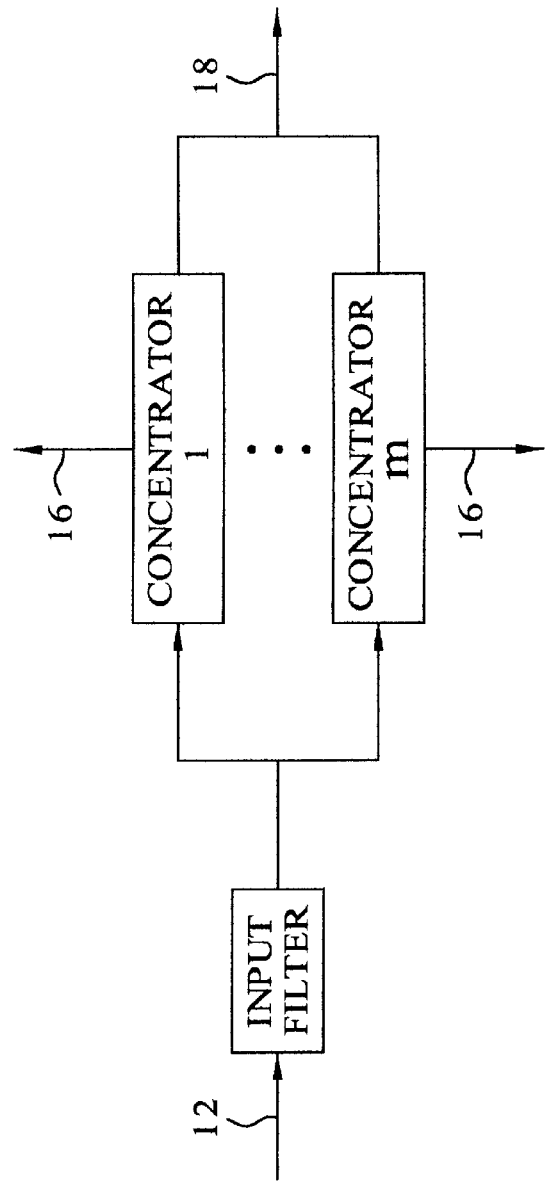
FIG. 14 is a block diagram of multiple microelectromechanical gas concentrators in parallel in accordance with the present invention.

An important aspect of the microelectromechanical gas concentrator is the ease of which it may be used in multiplicity as shown in FIGS. 13 and 14. FIG. 13 shows how multiple microelectromechanical gas concentrators may be connected in series. Gas mixture 12 enters through the optional input filter 12, then proceeds through multiple concentrators, each with its own residual gas port to expunge residual gas 16, resulting in a highly concentrated gaseous component 14 at the final output port. Multiple microelectromechanical gas concentrators may also be connected in parallel, as shown in FIG. 14. Connected in parallel, the output ports would produce a substantially greater volume of a selected gaseous component 18.

I claim:

1. An adsorption/desorption process of extracting a gaseous component from a gas mixture comprising the steps of:
    alternatively moving a adsorbent member between a first region and a second region;
    adsorbing a gaseous component from said first region with said adsorbent member, so that said adsorbent member becomes partially saturated with said gaseous component; and
    desorbing said gaseous component from said adsorbent member into said second region, so that said adsorbent member becomes substantially unsaturated;
    wherein said process occurs in a microelectromechanical system.

2. The adsorption/desorption process of claim 1, wherein said desorbing step comprises:
    exposing said partially saturated adsorbent member to radiant energy.

3. The adsorption/desorption process of claim 2, wherein said radiant energy is thermal radiation.

4. The adsorption/desorption process of claim 2, wherein said radiant energy is electromagnetic radiation.

5. The adsorption/desorption process of claim 4, wherein said electromagnetic radiation is sunlight.

6. The adsorption/desorption process of claim 2, wherein said gaseous component is oxygen and said gas mixture is air.

7. The adsorption/desorption process of claim 6, wherein said adsorbent member comprises a cobalt(II) salen complex.

8. The adsorption/desorption process of claim 2, wherein said adsorbent member comprises a semiconductor material.

9. The adsorption/desorption process of claim 8, wherein said semiconductor material comprises silicon.

10. The adsorption/desorption process of claim 8, wherein said adsorbent member comprises silicon dioxide.

11. An adsorption/desorption process of extracting a gaseous component from a gas mixture comprising the steps of:

alternatively moving a adsorbent member between a first region and a second region;

adsorbing a gaseous component from said first region with said adsorbent member, so that said adsorbent member becomes partially saturated with said gaseous component;

desorbing said gaseous component from said adsorbent member into said second region, so that said adsorbent member becomes substantially unsaturated; and exposing said partially saturated adsorbent member to radiant energy;

wherein said adsorbent member comprises a semiconductor material; and wherein said adsorbent member comprises silicon nitride.

12. A microelectromechanical gas concentrator comprising:
(a) an enclosed adsorption region for containing a first gas that includes a gaseous component;
(b) an enclosed desorption region for containing a second gas; and
(c) an adsorbent member, movable between said adsorption region and said desorption region for adsorbing said gaseous component from said first gas when in said adsorption region, and for desorbing said gaseous component when in said desorption region.

13. A microelectromechanical gas concentrator as recited in claim 12 wherein:
(a) said enclosed adsorption region includes an input port for allowing said first gas to enter said adsorption region; and
(b) said enclosed desorption region includes an output port for allowing said second gas to exit said desorption region.

14. A microelectromechanical gas concentrator as recited in claim 13, wherein said adsorbent member has a surface area sized, such that the volume of said gaseous component desorbed is sufficient to create and maintain a higher partial pressure in said desorption region than the partial pressure in said adsorption region.

15. A microelectromechanical gas concentrator as recited in claim 14, wherein said adsorbent member is cylindrical in shape and radially rotates, so that said adsorption layer alternatively moves between said adsorption region and said desorption region.

16. A microelectromechanical gas concentrator as recited in claim 14, wherein said adsorbent member is a comb shape and reciprocally moves, so that said adsorption layer alternatively moves between said adsorption region and said desorption region, said comb shape comprising:
a base; and
at least one comb tooth, attached orthogonally to said base.

17. A microelectromechanical gas concentrator as recited in claim 14, wherein said adsorbent member comprises a base layer and an adsorption layer.

18. A microelectromechanical gas concentrator as recited in claim 17, wherein said adsorption layer comprises a cobalt(II) salen complex.

19. A microelectromechanical gas concentrator as recited in claim 17, wherein said base layer comprises a semiconductor material.

20. A microelectromechanical gas concentrator as recited in claim 19, wherein said semiconductor material is silicon.

21. A microelectromechanical gas concentrator as recited in claim 17, wherein said base layer comprises silicon dioxide.

22. A microelectromechanical gas concentrator as recited in claim 17, wherein said base layer comprises silicon nitride.

23. A microelectromechanical gas concentrator as recited in claim 17, further comprising an adhesion layer located between said adsorption layer and said base layer, for isolating and providing adhesion between said adsorption layer and said base layer.

24. A microelectromechanical gas concentrator as recited in claim 23, wherein said adhesion layer comprises silicon.

25. A microelectromechanical gas concentrator as recited in claim 23, wherein said adhesion layer comprises silicon nitride.

26. A microelectromechanical gas concentrator as recited in claim 13, further comprising a radiant energy source, located in said desorption region, for subjecting said adsorbent member to radiant energy when in said desorption region, so that said gaseous component is desorbed from said adsorbent member into said desorption region.

27. A microelectromechanical gas concentrator as recited in claim 26, wherein said radiant energy source, is a heater strip.

28. A microelectromechanical gas concentrator as recited in claim 13, further comprising a mechanism, operably coupled to said adsorbent member, for moving said adsorbent member, such that said adsorbent member alternatively moves between said adsorption region and said desorption region.

29. A microelectromechanical gas concentrator as recited in claim 28, wherein said mechanism for moving said adsorbent member is an electrostatic potential.

30. A microelectromechanical gas concentrator as recited in claim 13, wherein said adsorption region further comprises a residual gas port, for allowing residual said first gas mixture to exit said adsorption region.

31. A microelectromechanical gas concentrator as recited in claim 13, wherein said gas is air and said gaseous component is oxygen.

32. A microelectromechanical gas concentrator comprising:
(a) a first region fabricated on a single substrate, said first region for containing a gas mixture that includes a gaseous component at a first concentration
(b) a second region fabricated on said substrate, said second region for containing a second gas mixture that includes said gaseous component at a second concentration, said second concentration being greater than said first concentration;
(c) means for adsorbing said gaseous component from said first gas mixture;
(d) means for moving said adsorbed gaseous component from said first to said second region; and
(e) means for desorbing said gaseous component into said second region.

33. A microelectromechanical gas concentrator as recited in claim 32, wherein said means for adsorbing and desorbing comprises maintaining said first region at a first temperature and said second region at a second temperature, said second temperature being higher than said first temperature.

34. A microelectromechanical gas concentrator as recited in claim 32, further comprising an input filter connected to said adsorption region for preventing contaminant particles from entering said adsorption region.

35. A microelectromechanical gas concentrator as recited in claim 32, further comprising means for measuring the pumping rate of said gas concentrator.

36. A microelectromechanical gas concentrator as recited in claim 32, wherein said gas concentrator is one of a plurality of gas concentrators fabricated on a single substrate.

* * * * *